United States Patent [19]
Alaimo et al.

[11] 3,899,503
[45] Aug. 12, 1975

[54] PROCESS FOR PREPARING 2-(2')-FURYL-, 2-(2')-THIENYL-2-(4')-THIAZOLYL- OR 2-(2')-PYRRYL-5 (OR 6) NITROBENZIMIDAZOLE

[75] Inventors: Robert J. Alaimo; Ronald J. Storrin, both of Norwich, N.Y.

[73] Assignee: Morton-Norwich Products, Inc., Norwich, N.Y.

[22] Filed: Jan. 25, 1974

[21] Appl. No.: 436,462

[52] U.S. Cl. .......................... 260/302 H; 260/309.2
[51] Int. Cl.² ...................................... C07D 235/18
[58] Field of Search ...................... 260/302 H, 309.2

[56] References Cited
UNITED STATES PATENTS
3,017,415  1/1962  Sarett et al. .................... 260/302 H

OTHER PUBLICATIONS

Kirk–Othmer, Encyclopedia of Chemical Technology, 2d. Ed., Vol. 16, John Wiley & Sons, 1968, p. 903.

The Merck Index, Eighth Ed., Merck & Co., Rahway, N.J., 1968, p. 907.

Elderfield (ed.), Heterocyclic Compounds, Vol. 5, John Wiley & Sons, 1957, pp. 283–284.

*Primary Examiner*—Richard J. Gallagher
*Attorney, Agent, or Firm*—Anthony J. Franze

[57] ABSTRACT

A process for preparing the title compounds involving reaction of furfural, thienaldehyde, pyrrole aldehyde or thiazolaldehyde and 4-nitro-o-phenylenediamine in the presence of benzoquinone is disclosed.

1 Claim, No Drawings

PROCESS FOR PREPARING 2-(2')-FURYL-,2-(2')-THIENYL-, 2-(4')-THIAZOLYL- or 2-(2')-PYRRL-5 (OR 6) NITROBENZIMIDAZOLE

This invention is concerned with a process for preparing 2-(2')-furyl-,2-(2')-thienyl-2(4')thiazolyl- or 2-(2')-pyrryl-5 (or 6) nitrobenzimidazole, compounds useful as intermediates in the preparation of anthelmintic agents as disclosed in South African Pat. No. 6,800,351 and U.S. Pat. No. 3,646,049.

In the past these valuable intermediates have been prepared in yields ranging from 40–87 percent by the Weidenhagen benzimidazole synthesis and, in the case of the furyl compound, by reaction of furfural and 4-nitro-o-phenylenediamine in the presence of nitrobenzene. These methods are subject to a number of shortcomings; unsatisfactory yield or a two step synthesis involving isolation of a cupric salt followed by treatment with noxious hydrogen sulfide and the risk of residual sulfur in the desired product.

It has now been discovered that these valuable intermediates can be readily prepared in high yield in a one step process and without the involvement of any undesirable reactant. In accordance with this invention furfural, thienaldehyde, thiazolealdehyde or pyrrole aldehyde are reacted with 4-nitro-o-phenylenediamine in the presence of benzoquinone in an alcoholic medium, preferably under the influence of heat.

In order that this invention may be readily available to and understood by those skilled in the art the following example is given:

2-(2')-Furyl-5 (or 6) nitrobenzimidazole

A mixture of 31 g (0.2 mole) of 4-nitro-o-phenylenediamine and 25 g (0.26 mole) of furfural in isopropanol (500 ml) was treated with 24 g (0.22 mole) of p-benzoquinone. The mixture was heated under reflux for 2 hours. The isopropanol solution was diluted with water to precipitate the product. The crude product weighed 46 g (100 percent). Recrystallization from nitromethane provided an analytical sample which melted at 228°–229°.

Anal. Calcd. for $C_{11}H_7N_3O_3$: C, 57.64; H, 3.08; N, 18.34. Found: C, 57.55; H, 3.04; N, 18.53.

Substituting thienaldehyde, thiazolealdehyde or pyrrole aldehyde for furfural in the above example secures the respective 2-thienyl, 4-thiazolyl or 2-pyrryl compound.

What is claimed is:

1. A process for preparing a compound of the formula:

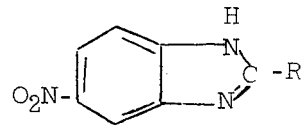

wherein R is 2-furyl, 2-thienyl, 4-thiazolyl or 2-pyrryl, which consists in reacting an aldehyde selected from the group consisting of furfural, thienaldehyde, thiazolealdehyde and pyrrole aldehyde with 4-nitro-o-phenylenediamine in the presence of benzoquinone.

* * * * *